(12) United States Patent
Ngia et al.

(10) Patent No.: US 7,502,484 B2
(45) Date of Patent: Mar. 10, 2009

(54) EAR SENSOR ASSEMBLY FOR SPEECH PROCESSING

(75) Inventors: Lester S. H. Ngia, Troy, MI (US); Christopher F. Vlach, Northfield Center, OH (US); Guerman G. Nemirovski, Shaker Heights, OH (US)

(73) Assignee: Think-A-Move, Ltd., Beachwood, OH (US)

( * ) Notice: Subject to any disclaimer, the term of this patent is extended or adjusted under 35 U.S.C. 154(b) by 0 days.

(21) Appl. No.: 11/762,980

(22) Filed: Jun. 14, 2007

(65) Prior Publication Data

US 2007/0291953 A1 Dec. 20, 2007

Related U.S. Application Data

(60) Provisional application No. 60/804,679, filed on Jun. 14, 2006.

(51) Int. Cl.
  *H04R 25/00* (2006.01)
(52) U.S. Cl. .................................. 381/320; 381/312
(58) Field of Classification Search ................ 381/23.1, 381/71.1, 71.2, 71.6, 72, 122, 312–315, 322, 381/324, 328; 600/23–25, 539; 340/573.1; 704/270
See application file for complete search history.

(56) References Cited

U.S. PATENT DOCUMENTS

| | | | |
|---|---|---|---|
| 3,633,705 A | 1/1972 | Teder |
| 3,995,113 A | 11/1976 | Tani |
| 4,017,797 A | 4/1977 | Laessig |
| 4,025,734 A | 5/1977 | Aloupis |
| 4,150,262 A | 4/1979 | Ono |
| 4,429,702 A | 2/1984 | von Recklinghausen |
| 4,533,795 A | 8/1985 | Baumhauer, Jr. et al. |
| 4,652,702 A | 3/1987 | Yoshii |
| 4,654,883 A | 3/1987 | Iwata |
| 4,922,471 A | 5/1990 | Kuehnel |
| 4,930,156 A | 5/1990 | Norris |
| 5,003,606 A | 3/1991 | Bordewijk |
| 5,138,663 A | 8/1992 | Moseley |

(Continued)

FOREIGN PATENT DOCUMENTS

CH 678692 10/1991

(Continued)

OTHER PUBLICATIONS

Sound Radio Products, "Better Living Through Wireless Technology", 2001, http://www.soundradio.com/en-921.html.

(Continued)

*Primary Examiner*—Brian Ensey
(74) *Attorney, Agent, or Firm*—Renner, Otto, Boisselle & Sklar, LLP

(57) ABSTRACT

An ear sensor apparatus includes a microphone positionable with respect to an ear canal to detect sound signals from the ear canal and to generate a corresponding output signal. The apparatus may include a seal for substantially blocking ambient sound signals from reaching the microphone and an interface to convey the output signal to a remote speech recognition apparatus. The output signal may be normalized so that the normalized output signal is more representative of speech from a user's mouth than speech detected from the user's ear.

16 Claims, 5 Drawing Sheets

U.S. PATENT DOCUMENTS

| | | |
|---|---|---|
| 5,149,104 A | 9/1992 | Edelstein |
| 5,164,984 A | 11/1992 | Suhami et al. |
| 5,251,263 A | 10/1993 | Andrea et al. |
| 5,280,524 A | 1/1994 | Norris |
| 5,298,692 A | 3/1994 | Ikeda et al. |
| 5,327,506 A | 7/1994 | Stites, III |
| 5,363,444 A | 11/1994 | Norris |
| 5,373,555 A | 12/1994 | Norris et al. |
| 5,426,719 A | 6/1995 | Franks et al. |
| 5,448,637 A | 9/1995 | Yamaguchi et al. |
| 5,606,607 A | 2/1997 | Yamaguchi et al. |
| 5,659,156 A | 8/1997 | Mauney et al. |
| 5,659,620 A | 8/1997 | Kuhlman |
| 5,664,014 A | 9/1997 | Yamaguchi et al. |
| 5,721,783 A * | 2/1998 | Anderson .................. 381/328 |
| 5,740,258 A | 4/1998 | Goodwin-Johansson |
| 5,774,565 A | 6/1998 | Benning et al. |
| 5,790,684 A | 8/1998 | Niino et al. |
| 5,812,659 A | 9/1998 | Mauney et al. |
| 5,812,978 A | 9/1998 | Nolan |
| 5,844,824 A | 12/1998 | Newman et al. |
| 5,844,984 A | 12/1998 | Yamaguchi et al. |
| 5,878,396 A | 3/1999 | Henton |
| 5,881,159 A | 3/1999 | Aceti et al. |
| 5,896,451 A | 4/1999 | Deas |
| 5,933,506 A | 8/1999 | Aoki et al. |
| 6,004,274 A | 12/1999 | Nolan et al. |
| 6,021,207 A | 2/2000 | Puthuff et al. |
| 6,022,311 A | 2/2000 | Juneau et al. |
| 6,024,700 A | 2/2000 | Nemirovski et al. |
| 6,072,884 A | 6/2000 | Kates |
| 6,094,492 A | 7/2000 | Boesen |
| 6,156,585 A | 12/2000 | Gogoi et al. |
| 6,175,633 B1 | 1/2001 | Morrill et al. |
| 6,181,801 B1 | 1/2001 | Puthuff et al. |
| 6,185,309 B1 | 2/2001 | Attias |
| 6,253,175 B1 | 6/2001 | Basu et al. |
| 6,283,915 B1 | 9/2001 | Aceti et al. |
| 6,408,081 B1 | 6/2002 | Boesen |
| 6,456,721 B1 | 9/2002 | Fukuda |
| 6,503,197 B1 | 1/2003 | Nemirovski |
| 6,560,468 B1 | 5/2003 | Boesen |
| 6,567,524 B1 | 5/2003 | Svean et al. |
| 6,574,345 B1 | 6/2003 | Huang |
| 6,647,368 B2 * | 11/2003 | Nemirovski ................ 704/270 |
| 6,661,901 B1 | 12/2003 | Svean et al. |
| 6,671,379 B2 | 12/2003 | Nemirovski |
| 6,683,965 B1 | 1/2004 | Sapiejewski |
| 6,691,073 B1 | 2/2004 | Erten et al. |
| 6,718,043 B1 | 4/2004 | Boesen |
| 6,728,385 B2 | 4/2004 | Kvaloy et al. |
| 6,741,718 B1 | 5/2004 | Brumitt et al. |
| 6,754,358 B1 | 6/2004 | Boesen et al. |
| 6,754,359 B1 * | 6/2004 | Svean et al. .................. 381/328 |
| 6,819,762 B2 | 11/2004 | Jones et al. |
| 6,917,688 B2 * | 7/2005 | Yu et al. ..................... 381/122 |
| 6,952,483 B2 | 10/2005 | Boesen et al. |
| 7,039,195 B1 | 5/2006 | Svean et al. |
| 2001/0017926 A1 | 8/2001 | Vicamini |
| 2002/0118852 A1 | 8/2002 | Boesen |
| 2002/0186858 A1 | 12/2002 | Masuda et al. |
| 2003/0147544 A1 | 8/2003 | Lichtblau |
| 2003/0185403 A1 | 10/2003 | Sibbald |
| 2004/0125979 A1 | 7/2004 | Elidan et al. |
| 2004/0197002 A1 | 10/2004 | Atsumi et al. |
| 2005/0013456 A1 | 1/2005 | Chalupper et al. |
| 2005/0058313 A1 | 3/2005 | Victorian et al. |
| 2005/0117771 A1 | 6/2005 | Vosburgh et al. |
| 2005/0147266 A1 | 7/2005 | Eggers et al. |
| 2005/0157895 A1 | 7/2005 | Lichtblau |

FOREIGN PATENT DOCUMENTS

| | | |
|---|---|---|
| GB | 2197158 | 5/1988 |
| GB | 2234882 | 2/1991 |
| JP | 10023578 | 1/1998 |
| SE | 526085 | 6/2005 |
| WO | 9410818 | 5/1994 |

OTHER PUBLICATIONS

Ngia, Lester S. H., "Separable Nonlinear Least-Squares Methods for Efficient Off-Line and On-line Modeling of Systems Using Kautz and Laguerre Filters," IEEE Transactions on Circuits and Systems—II: Analog and Digital Signal Processing, vol. 48, No. 6, pp. 562-579, Jun. 2001.

Rupp, Markus, "A Family of Adaptive Filter Algorithms with Decorrelating Properties," IEEE Transactions on Signal Processing, vol. 46, No. 3, pp. 771-775, Mar. 1998.

Yasukawa, Hiroshi and Shimada, Shoji, "An Acoustic Echo Canceller Using Subband Sampling and Decorrelation Methods," IEEE Transactions on Signal Processing, Vo. 41, No. 2, pp. 926-930, Feb. 1993.

Sjoberg, Jonas and Ngia, Lester S.H., "Nonlinear Modeling, Advanced Black-Box Techniques," Chapter 1, "Neural Nets and Related Model Structures for Nonlinear System Identification," pp. 1-28, Kluwer Academic Publishers, 1998.

Westerlund et al., "In-ear Microphone Equalization Exploiting an Active Noise Control", Proceedings of Internoise 2001, Aug. 2001, pp. 1-6.

International Search Report and Written Opinion from corresponding International Application No. PCT/US07/71209.

* cited by examiner

EAR SENSOR ASSEMBLY FOR SPEECH PROCESSING

RELATED APPLICATION DATA

This application claims the benefit of U.S. Provisional Patent Application No. 60/804,679, the disclosure of which is incorporated herein by reference in its entirety.

TECHNICAL FIELD

The present disclosure generally relates to an ear sensor assembly having at least a microphone that can be placed with respect to an ear. Among other applications, the ear sensor has particular application for speech processing.

BACKGROUND

Speech processing is a term that broadly describes the study of speech signals and the processing methods applied to these signals. Various categories of speech processing exist. One category is speaker recognition, which is also referred to in the art as voice recognition. Speaker recognition is the task of recognizing the identity of a person from his or her voice.

Another category of speech processing is speech recognition. Some forms of speech recognition, such as found in dictation systems, attempt to convert a signal output by a microphone used to capture the user's speech into a sequence of words (e.g., text). Other forms of speech recognition, such as found in some voice activated telephones, attempt to recognize patterns in the signal and carry out an associated command. For instance, if the user were to say "call home," the device processing the speech would not "understand" what was said by converting the speech to text, but would match the speech to a command function.

As will be appreciated, the quality of a signal from the microphone used to detect a user's speech will greatly affect the quality of automated speech processing carried out by a host device (e.g., a computer executing speech recognition software). Signals from the environment surrounding the user that are detected by the microphone can greatly diminish the accuracy of speech processing. An article titled "Speech Recognition" downloaded from the WIKIPEDIA website on the Internet under the heading "Speech Recognition" on Jun. 3, 2006 reports that the typical achievable recognition rate as of 2005 for large-vocabulary, speaker-independent speech recognition systems is only about 80% to 90% for a clear environment, and can be as low as 50% for scenarios with background noise.

Accordingly, there is a need in the art for an improved apparatus for detecting user speech for purposes of speech processing, as well as associated methods of speech signal detection and signal processing.

SUMMARY

According to one aspect of the disclosure, a remote speech recognition apparatus includes a microphone positionable with respect to an ear canal to detect sound signals in or near the ear canal and to generate a corresponding output signal; a seal for substantially blocking ambient sound signals from reaching the microphone; and an interface to convey the output signal to a remote speech recognition apparatus.

According to one embodiment, the remote speech recognition apparatus further includes a housing that retains the microphone and the seal.

According to one embodiment of the remote speech recognition apparatus, the interface includes a set of conductors.

According to one embodiment of the remote speech recognition apparatus, the interface includes a wireless interface adapter.

According to one embodiment of the remote speech recognition apparatus, the microphone is fluidly coupled to the ear canal via a channel disposed in the ear piece.

According to one embodiment of the remote speech recognition apparatus, the channel is defined by a tube.

According to one embodiment of the remote speech recognition apparatus, the channel is generally linear and, when the ear piece is placed with respect to the ear, the channel is generally arranged along a longitudinal axis of the ear canal.

According to one embodiment, the remote speech recognition apparatus further includes a housing that retains the microphone and the seal, the channel disposed within the housing.

According to one embodiment of the remote speech recognition apparatus, the seal includes at least one annular resilient member that, when the ear piece is placed with respect to the ear, engages the ear at an opening of the ear canal.

According to one embodiment of the remote speech recognition apparatus, the output signal from the microphone corresponds to a portion of speech and has a different spectral response than a spectral response of the same speech as detected from the mouth of a user.

According to one embodiment, the remote speech recognition apparatus further includes a host that executes speech recognition software to process the output signal.

According to one embodiment of the remote speech recognition apparatus, the software has greater than 90% accuracy using a raw form of the output signal as an input to the software.

According to another aspect of the invention, a sound processing apparatus includes a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone.

According to one embodiment of the sound processing apparatus, the microphone and the circuit are contained within a housing that is retained by the ear of the user.

According to one embodiment of the sound processing apparatus, the microphone is contained within an ear piece that is retained by the ear of the user and the circuit forms a part of a separate device that is interfaced with the ear piece.

According to one embodiment of the sound processing apparatus, the normalization function is an inverse of a transfer function that is based on a ratio of a spectral response of a speech sample detected from the mouth of a sampled individual to a spectral response of the speech sample detected from the ear of the sampled individual.

According to one embodiment of the sound processing apparatus, the transfer function is a composite function that is combination of plural spectral response ratios taken from plural individuals.

According to one embodiment of the sound processing apparatus, the transfer function is a combination of a series of ratio values of the spectral response of the speech detected from the ear to the spectral response of the speech detected from the mouth for each of plural time frames of the speech sample.

According to one embodiment of the sound processing apparatus, the time frames are about 10 milliseconds to about 30 milliseconds long.

According to one embodiment of the sound processing apparatus, the transfer function is user dependent and the speech sample is generated by the user of the sound processing apparatus.

According to one embodiment of the sound processing apparatus, the transfer function is user independent and the speech sample is generated by at least one speaker different than the user of the sound processing apparatus.

According to one embodiment of the sound processing apparatus, the normalization function is an inverse of a transfer function that is based on a ratio of a time domain response of a speech sample detected from the mouth of a sampled individual to a time domain response of the speech sample detected from the ear of the sampled individual.

According to one embodiment of the sound processing apparatus, the normalization function is adaptively established by an adaptive filter that models a difference between a sound signal from the ear and a corresponding sound signal from the mouth.

According to one embodiment of the sound processing apparatus, the normalization function is based on a transformation matrix that is selected to decorrelate a current value of the output signal from the microphone from a past history of output signal values.

According to one embodiment of the sound processing apparatus, the normalization function is based on a transformed version of an input vector that models the difference between the sound signal from the ear and the corresponding sound signal from the mouth.

According to one embodiment of the sound processing apparatus, the normalization function is based on a non-transformed version of an input vector that models the difference between the sound signal from the ear and the corresponding sound signal from the mouth.

According to one embodiment of the sound processing apparatus, the normalization function is established by sampling speech data from an ear and a mouth of a user for a period of time and adaptively generating the normalization function over the period of time.

According to one embodiment of the sound processing apparatus, the adaptive updating of the normalization function is stopped after the period of time.

According to one embodiment, the sound processing apparatus, further includes a host that executes speech recognition software to process the normalized output signal.

According to one embodiment, the sound processing apparatus, further includes a communications device that transmits the normalized output signal to a remote destination.

BRIEF DESCRIPTION OF DRAWINGS

These and further features will be apparent with reference to the following description and drawings, wherein.

DESCRIPTION

I. Introduction

Figure 1:
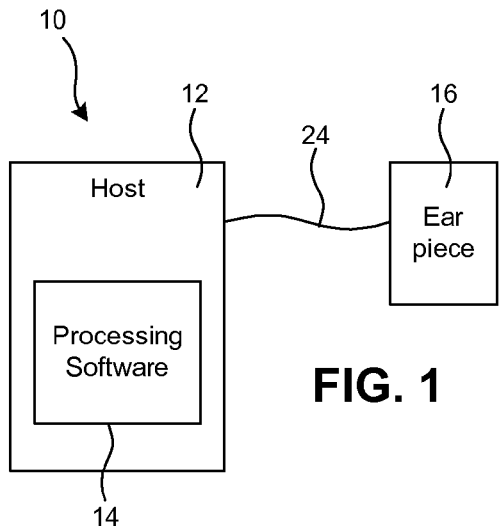
FIG. 1 is a schematic block diagram of a sound signal processing system that includes an ear piece.

In the description that follows, like components have been given the same reference numerals, regardless of whether they are shown in different embodiments. To illustrate various embodiments in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Disclosed herein are various embodiments of an ear piece assembly that may be used with, for example, a host device that executes speech processing software. As will be discussed below, other possible uses for the ear piece assembly exist. For example, the ear piece set assembly that can be used with a communication system that allows a user to carry on a conversation with a remotely located person.

In one embodiment, the ear piece assembly includes a microphone that is positionable with respect to an ear canal to detect signals associated with the ear canal, a seal for blocking ambient signals and a wired or wireless connection to a remote apparatus. These components may be supported by a housing so that the ear piece assembly is retained by the ear of the user and allows for hands free use of the ear piece. The microphone is arranged to detect air pressure changes occurring within the ear, which may be described as sounds in the ear canal and/or emanating from (e.g., coming out of) the ear canal. Thus, the microphone may be used to accurately and reliably detect the speech of the user.

The user's speech that may be detected at the ear is typically muted (e.g., muffled) relative to the "natural" sound of the speech that emanates from the user's mouth. The applicants have unexpectedly found, however, that the signal output by the microphone using the ear piece described herein can be accurately processed using speech recognition software included with MICROSOFT's XP operating system at an accuracy rate of about 97%. Even with these results, one embodiment of the ear piece may include a circuit to normalize the signal output by the microphone so that the signal more accurately represents the "natural" sound of the user's voice. This embodiment may improve speech recognition results and/or may find application for voice communications.

Without intending to be bound by theory, the disclosed ear piece assembly allows a user to speak more quietly (e.g., such as at a whisper or near whisper) than is needed for adequate functioning of conventional headsets. This allows for more private conversations and less disruption to others.

The disclosed ear piece assembly does not rely on the detection of sound that has emanated directly from the user's mouth. Therefore, there is a reduced need to repeatedly adjust the position of the ear piece that would otherwise distract the user and require the use of the user's hands. Also, the size and arrangement of the ear piece is small, resulting in a more cosmetically appealing device. Such a device can be used unobtrusively. For example, the device would not be noticed as much by others when used in public, or by a person being observed by others, such as, for example, a television news anchor or a secret service agent.

It is noted that the term air pressure changes is used in its broadest sense and includes, for example, sound waves (whether audible to the user or not), pressure fluctuations, vibrations, resonations and the like. In addition, the term air pressure changes, as used herein, includes vibrations conducted by the bones and tissue of the user that are carried to ear. These conducted vibrations can vibrate the anatomical parts of the ear and/or the housing and lead to sound detection by the microphone. The air pressure changes may be caused by one or more factors, including vibrations of the ear drum, vibrations of bone within the ear, vibrations of other anatomical structures within the ear and vibrations conducted by the bones and/or tissue of the user to the ear and which invoke an air pressure change in and/or emanating from the ear.

As a result, the ear piece assembly (also referred to herein as an ear sensor assembly) can be used to detect a person's speech and output a corresponding signal. It is also noted that the term speech is used in its broadest sense and includes spoken words and utterances, as well as other vocalizations produced by the user, including, for example, grunts, whistles, singing, coughs, "clicking" sounds made by movement of the lips or tongue, and the like. To facilitate the description herein, the event of sensing or detecting by the microphone will be referred to as detecting and that which is detected will be referred to as a change within the ear, or simply an air pressure change. The ear piece assembly monitors changes within and/or emanating from the human ear which occur instantaneously, or nearly instantaneously, in response to the speech of the person to provide a substantially real-time speech detection system. Other uses for the ear piece assembly include, for example, a thought detection system, a movement and/or voluntary physical action detection system, a speech processing system, a medical diagnostic system and so forth. Collectively, these systems will be referred to as sound processing systems. Examples of various communication systems and/or sound processing systems in which the ear piece assembly described herein can be used are found in co-owned U.S. Pat. Nos. 6,024,700, 6,503,197, 6,647,368 and 6,671,379, the disclosures of which are herein incorporated by reference in their entireties.

II. Apparatus

Turning now to the figures, FIG. 1 is a block diagram that illustrates a sound signal processing system 10 for processing signals representative of sounds detected in association with the ear canal of a user. The system 10 includes a host device 12, such as a computer, mobile telephone, personal digital assistant (PDA) or the like. The host 12 may be connected in a larger system and may be used to control another device (e.g., a wheel chair, machinery, etc.) or provide input to a logical operation (e.g., a software program executed by the host 12 or another device). The host 12 may be any device capable of executing logical instructions including, in particular, processing software 14 that acts upon a signal generated and output by an ear piece 16. In a preferred embodiment, the processing software 14 is speaker-independent speech recognition software. However, any other signal processing or speech processing software may be executed by the host to act upon the signal output by the ear piece 16.

In another example, the host 12 can be a medical diagnostic system where detected sounds corresponding to the user's heart beat, breathing and/or gastrointestinal system are converted into visual and/or data forms for use by medical professionals. In another example, the sound processing apparatus 12 can be a control system where sounds corresponding to voluntary actions of the user are converted into control instructions for a device, such as a computer, wheelchair, item of machinery, etc. In this embodiment, the sounds can correspond to thoughts of the user as set forth in co-owned U.S. Pat. No. 6,024,700, movements of the user as set forth in co-owned U.S. Pat. No. 6,503,197, or spoken or other vocally generated sounds.

As indicated, the sound signal processing system 10 includes an ear piece assembly, generally referred to by reference numeral 16. With additional reference to FIGS. 5-7, the ear piece 16 can include a microphone 18 and a seal 20 that are supported by a housing 22. The physical arrangement and detailed operation of the ear piece 16 will be described more fully below. The microphone 18 is used to detect sounds in, near and/or emanating from the ear of the user (collectively referred to as air pressure changes of the ear) that result from, for example, speech of the user. The microphone 18 converts those detections into an electrical signal that is input to the host 12.

An interface may couple the ear piece 16 to the host 12 or some other device. In the embodiments of FIGS. 1, 2, 5 and 6, the interface is an appropriate set of conductors 24. The conductors can include a wire or wires coupling the microphone 18 to the host 12. In other embodiments, the interface that couples the ear piece 16 to the host 12 or some other device may be wireless. For instance, in the embodiment of FIG. 7, the ear piece 16 includes a wireless adapter 26, such as a Bluetooth adapter. The host 12 may have a coordinating wireless adapter (not shown) to exchange signals with the wireless adapter 26 and receive the signal output by the microphone 18.

Figure 2:
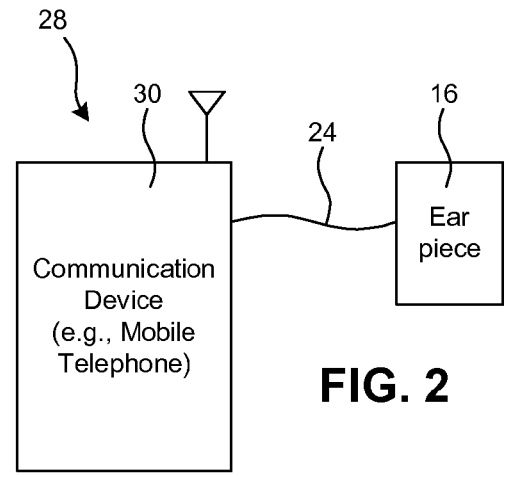
FIG. 2 is a schematic block diagram of a telecommunications system that includes an ear piece.

As indicated, the ear piece 16 can be used with other systems and devices other than the host device 12. For example, as shown in FIG. 2, the ear piece 16 may form part of a communications system 28 for establishing duplexed (two-way) audio communication between two or more individuals. The system 28 includes a communication device 30, such as a telephone. In the illustrated embodiment, the communication device 30 is a wireless telephone, such as mobile or cellular telephone. The device 30 can establish communication with a communications network (not shown), or backbone network, that enables a user of the device 30 to carry on a conversation with a remotely located person using a remotely located communication device (e.g., another telephone) as is known in the art. It will be appreciated that the communication device 30 and/or any remote communication device (not shown) can be other types of devices, including hardwired (land line) telephones, radios, personal digital assistants (PDAs), portable or stationary computers, voice over internet protocol (VoIP) devices, etc. Also, the communications network can be a network of any type, such as telephone systems, the Internet, a WAN, or a LAN.

Figure 7:
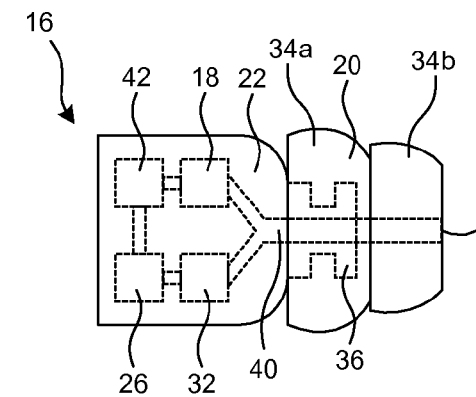
FIG. 7 is a schematic diagram of yet another exemplary embodiment of an ear piece.

For use in the communications system 28, the ear piece 16 may include the microphone 18 and a speaker 32 as shown in FIG. 7. The speaker 32 may be used to output sounds to the user. These sounds can include sounds generated in response to signals received by the communication device 30 over the communications network. In this way, the ear piece 16 and communication device 30 can be used as a bi-directional communication apparatus.

Figure 3:
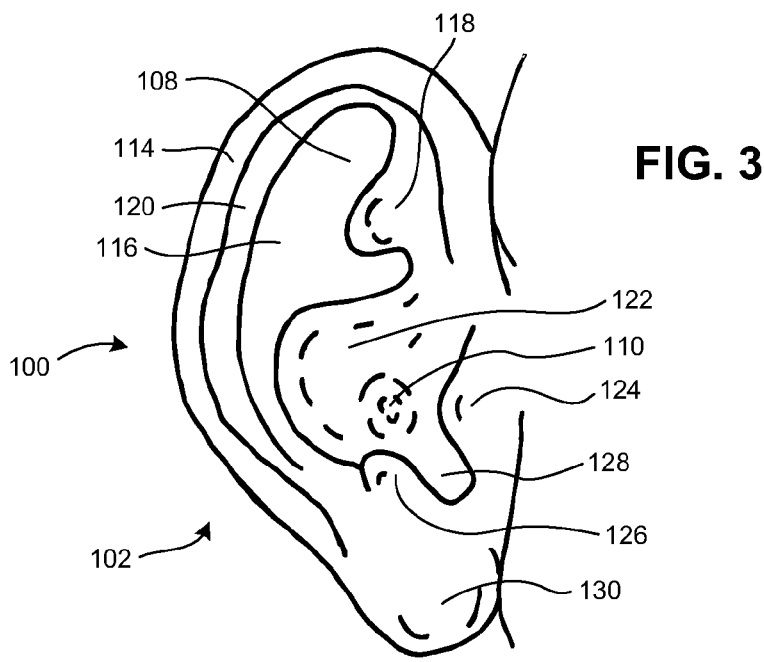
FIG. 3 is a schematic view of an ear.
Figure 4:
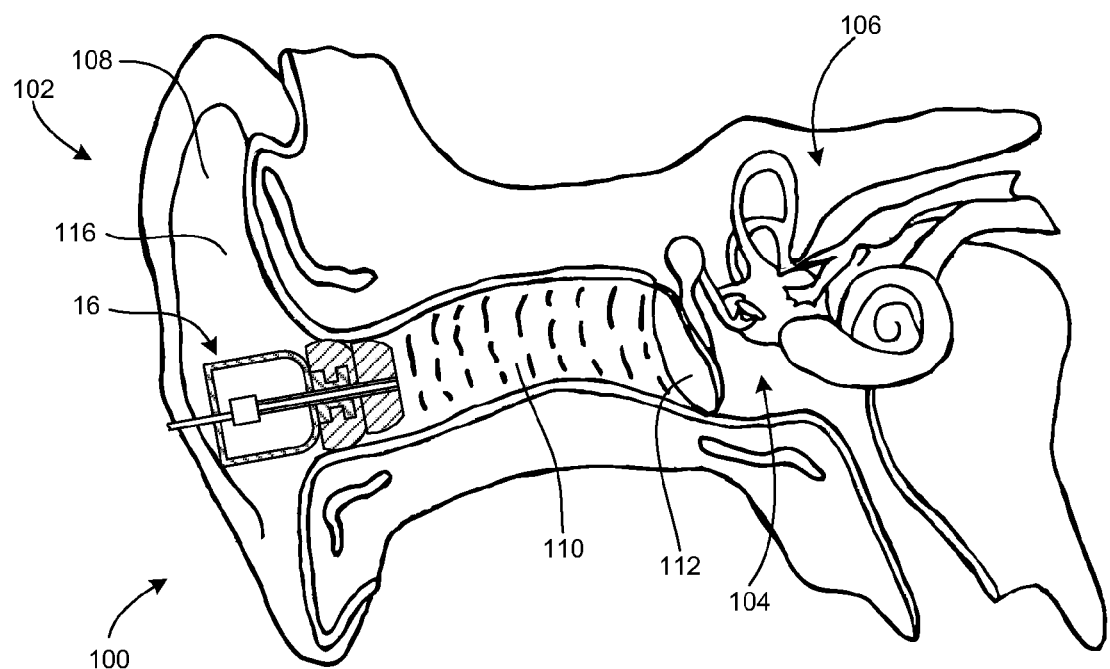
FIG. 4 is a cross-sectional view of the ear having an ear piece disposed with respect thereto.

Referring to FIGS. 3 and 4, an external view and a cross-sectional view of an ear 100 are respectively illustrated. FIG. 4 also schematically shows the ear piece 16 disposed with respect to the ear. The ear piece 16 also is shown in cross-section in FIG. 4. According to Henry Gray's famous text "Anatomy", the human ear is divided into three parts, including the external ear 102, the middle ear (or tympanum) 104 and the internal ear (or labyrinth) 106. The middle ear 104 and the internal ear 106 will not be described in great detail herein. The external ear 102 includes an expanded portion, or a pinna 108 (also referred to as an auricle), and an ear canal 110 (also referred to as a meatus or auditory canal). The pinna 108 serves to collect vibrations of the air surrounding the person's head. The ear canal 110 conducts those vibrations to the tympanum, or eardrum 112.

The pinna 108 has a generally ovoid form with a larger end directed upward and having an outer surface that is irregularly concave and directed slightly forward. The pinna 108 has a number of eminences and depressions. Typically, the ear 100 has a prominent and curved rim, or helix 114. Generally parallel to the helix 114 is another curved prominence, or antihelix 116. The antihelix 116 bifurcates to form a triangular depression, or a fossa of the antihelix 118 (also referred to as a fossa triangularis). A narrow, curved depression located between the helix 114 and antihelix 116 is referred to as fossa of the helix, or scapha 120. The antihelix 116 also curves around a deep, capacious cavity, or the concha 122 (the concha 122 being divided by the commencement of the helix 114, or crus helicis, into an upper part, termed the cymba conchae, and a lower part, termed the cavum conchae). The concha 122 leads inward to an opening of the ear canal 110. In front of the concha 122 and projecting backward (usually over the opening of the ear canal 110) is a pointed eminence, or tragus 124. Opposite the tragus 124 is a tubercle, or antitragus 126. A notch-like depression, or incisura intertragica 128, is disposed between the tragus 124 and antitragus 126. A lobule 130 is present under the tragus 124 and antitragus 126.

The ear canal 110 is an oval cylindrical passage extending from a bottom of the concha 122 to the ear drum 112. The ear canal 110 is about an inch and a half in length when measured from the tragus 124 to the ear drum 112. When measured from the bottom of the concha 122 to the ear drum 112, the ear canal is about an inch long. The ear canal 110 forms a gradual "S-shaped" curve and is directed, at first, inward, forward and slightly upward (i.e., pars externa). The ear canal 110 then passes inward and backward (i.e., pars media) and then passes inward, forward and slightly downward (i.e., pars interna).

It is not certain what physical, chemical or neural mechanism causes or generates the changes in air pressure in or near the ear or sounds to come from the ear in response to various actions of the user. However, due to the connection of the oral cavity to the ear via the eustachian tube, speech and movements of the mouth may cause a change in air pressure or an airflow to or from the ear leading to a detectable air pressure change that can be detected by the microphone 18. Regardless of the exact physical, chemical or neural mechanism, empirical testing has confirmed that the user's speech generates pressure changes in, near or from the ear of the person. Consequently, the air pressure changes can be monitored in or near the ear and used to detect the speech of a user.

In this document, various forms of the terms "changes in air pressure", "changes within the ear", and sounds "emanating" or "coming from" the ear are used their broadest sense to characterize the parameter being measured. Changes in air pressure may alternatively be characterized as sound waves or as signals. These sound waves (or vibrations) may propagate through mediums other than air, such as bone and tissue. As is well known by those skilled in the art, as a sound wave spreads out from its source its intensity falls off (the energy per unit area decreases with the inverse square of the distance), but the total energy is constant.

FIG. 4 illustrates the ear piece 16 inserted at least partially into the ear 100 of a person (i.e., at least within the cavity defined by the pinna 108, if not deeper within the ear 100 such as within the concha 122, at the opening of the ear canal 110 or slightly into the ear canal 110). In a preferred embodiment, the seal 20 engages the ear canal 110 at the opening of the ear canal 110. In this arrangement, the ear piece 16 may be retained by the ear 100. Also, the seal 20 may work with the surrounding tissue to seal off sound signals from the user's environment to reduce the detection of or interference from ambient sounds (e.g., people talking, machinery, animals, wind, etc.). The sealing may also assist in minimizing disruption to the signals from the ear before they reach the microphone 18. In the illustrated embodiment, the microphone 18 is retained by the housing in a position outside the ear canal 110. However, the microphone 18 may be positioned, relative to the ear 100, close to the opening of the ear canal 110 or in the ear canal 110.

Figure 5:
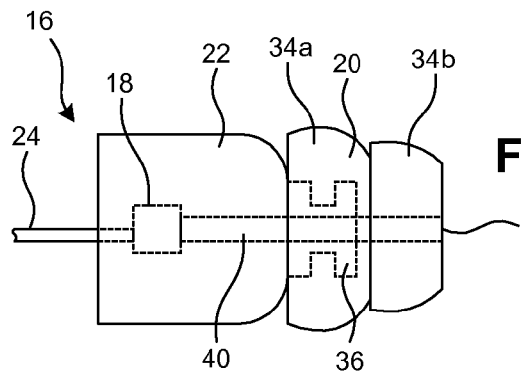
FIG. 5 is a schematic diagram of an exemplary embodiment of an ear piece.

With additional reference to FIG. 5, components of an embodiment of the ear piece 16 are schematically illustrated. As indicated, the ear piece 16 includes a housing 22, which may have unitary or multipart construction.

The housing 22 can take on a number of different physical configurations. For example, the housing 22 can resemble the housing design of a hearing aid, and particularly a digital hearing aid, for similar insertion, or partial insertion, into the ear 100. Alternatively, the housing 22 can resemble a miniature earphone as used with personal audio/music players. Such ear phones are commonly referred to as "ear buds". The ear piece 16 can be retained by insertion into the ear 100 as shown or by a member disposed over or hanging from the ear and/or by a headset assembly.

The housing 22 can be made from any suitable material, such as plastic, rubber or a gel-like material. In a preferred embodiment, the housing 22, or portions thereof, is made of relatively rigid plastic, but alternative embodiments can includes making the housing from pliable material, sound absorbing (or sound proofing) material and/or include sound insulating material such as foam. The housing 22 defines a hollow cavity (or cavities) in which the operative components of the ear piece 16 are placed. Voids in the cavity can be unfilled or filled with foam or other material. In another arrangement, the inside surfaces of the housing 22 can be shaped to conform to the components contained therein so that the volume of any unoccupied cavities surrounding the various components is minimized.

The seal 20 may be made from rubber or gel-like material. In the illustrated embodiment, the seal 20 includes two stacked annular members 34a and 34b that are integrally formed with one another or securely joined, such as with adhesive. The annular member 34b is slightly smaller than the annular member 34a and is positioned for deeper insertion into the ear canal than the annular member 34a. The housing 22 may include a hub 36 that retains the seal 20. For instance, at least one of the annular members 34, such as the annular member 34a in the illustrated embodiment, is arranged to conform to an annular indentation of the hub 36 to form an interference fit therewith.

The ear piece 16 can be custom designed for the individual user so as to form a close and comfortable fit with the ear of the individual. Alternatively, the ear piece 16 can have a standard, or "stock", design for all individuals. Stock design ear pieces 16 may be fabricated in a number of sizes. As one skilled in the art will appreciate, alternative physical configurations for the ear piece 16 are possible.

Sounds from the ear canal 110 may be conveyed to the microphone 18 through an air medium via a channel 40 or passageway of the ear piece 16. The channel 40 may terminate at an opening of the ear piece 16 that fluidly communicates with the ear canal. The opening may be referred to as a port 38. The channel 40, in the illustrated embodiments, is defined by a tube. However, the channel 40 may be defined by the construction of the housing 22 and/or seal 20. For example, a bore or hole in these components may allow fluid coupling of the microphone 18 and the ear canal 110.

The foregoing arrangement allows detection of air pressure changes of the ear, such as sounds emanating from the ear. In particular, sound waves present at the port 38 are communicated to the microphone 18. This arrangement reduces the detection of sound waves other than those present at the port 38 by minimizing a conveyance path to the microphone 18 for such sound waves. Additional isolation of the microphone 18 can be accomplished by encapsulating the microphone 18 in a suitable polymer that conforms to the exterior surfaces of the body of the microphone 18.

When used with the host 12, the ear piece 16 can be used to generate a signal indicative of the user's speech that may be processed with great accuracy by speech recognition software, even in noisy environments or when the user speaks at a whisper. Without intending to be bound by theory, the unexpected speech recognition accuracy described above is directly attributable to the arrangement of the ear piece 16 having a seal 20 and a direct channel 40 to convey sounds from the ear canal 110 to the microphone 18. In addition, the accuracy is achieved even though the signal generated by the microphone 18 in response to user speech and input to the host over the interface 24 is uncorrected for the differences in spectral characteristics between the user's voice detected from the ear canal 110 and the same speech detected from the user's mouth.

As will be appreciated, the voice signal from the microphone 18 is relatively strong due to sealing of the ear canal with the earpiece 16. The illustrated approach to sealing the ear canal is to use the seal 20, which resembles a rubber cup. The sealing is made to pick up as much sound as possible from the ear and, as indicated above, may be made to specifically exclude as many external sounds as possible or not be specifically made to exclude external sounds. In either case, the voice signal detected by the microphone 18 is changed from its natural form, or the speech that one may expect to hear from the user's mouth. The differences are most likely due to the anatomical structures conveying the sound to the ear and/or the enclosed spaces of the ear canal 110 and channel 40. In the signal detected by the microphone 18, high frequencies are suppressed and there is a prominence of low frequency components relative to the "normal" voice for the same speech.

Figure 6:
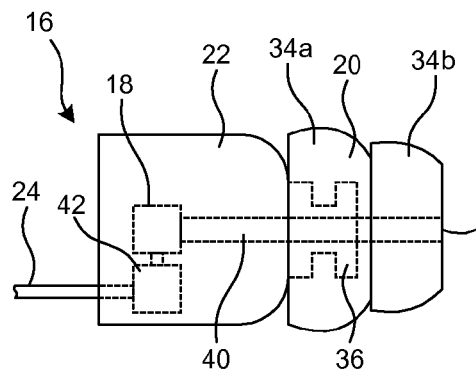
FIG. 6 is a schematic diagram of another exemplary embodiment of an ear piece.

With additional reference to FIG. 6, the ear piece 16 may include a circuit 42 to conform the speech detected by the microphone 18 to be more closely representative of the "normal" speech of the user. The circuit 42 may be implemented in hardware, such as an application specific integrated circuit (ASIC), a set of filters (e.g., band pass filters), a digital signal processor, etc. Alternatively, the functions of the circuit 42 may be implemented in software, firmware or a combination of hardware and software. In one embodiment, the functions of the circuit 42 are carried out by the host 12 or the communication device 30.

Figure 8:
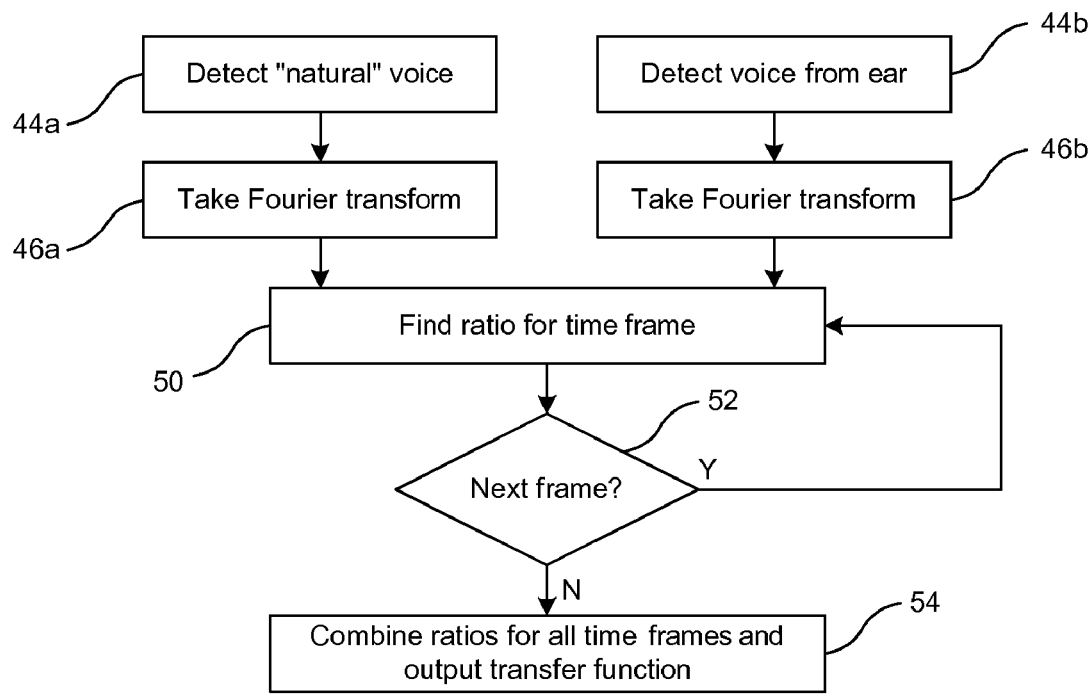
FIG. 8 is a flow chart depicting a method of generating a transfer function used to normalize a microphone output signal.
Figure 11:
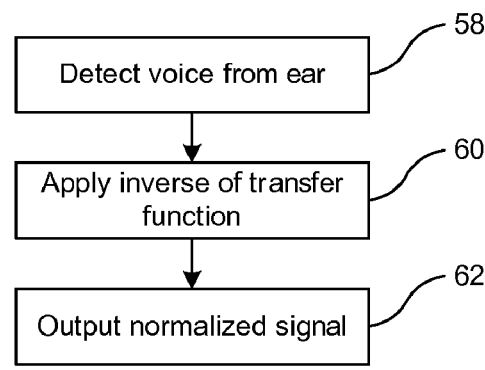
FIG. 11 is a flow chart depicting a method of normalizing a microphone output signal using the transfer function.

The circuit 42 may adapt (e.g., normalize) the output signal of the microphone 18 using a predetermined transfer function. One exemplary technique for generating the transfer function will be described with respect to FIG. 8 and one exemplary technique for normalizing the output signal of the microphone 18 using the transfer function will be described with respect to FIG. 11. The flow charts of FIGS. 8 and 11 may be thought of as depicting steps of a method or methods. Although FIGS. 8 and 11 show a specific order of executing functional logic blocks, the order of execution of the blocks may be changed relative to the order shown. Also, two or more blocks shown in succession may be executed concurrently or with partial concurrence. Certain blocks also may be omitted.

The method of transfer function generation represented by FIG. 8 may be carried out to create a transfer function specific to the user. However, the applicants have determined that a single transfer function may be developed that works suitably well for many possible users, if not almost all users. Thus, in a preferred embodiment, the predetermined transfer function applied by the circuit 42 is a generic transfer function that is developed for multiple users.

Referring to FIG. 8, the method of personalized or generic transfer function generation may begin in blocks 44a and 44b. In block 44a, the "natural" speech of a person is detected with a microphone (not shown) that outputs a first signal. The natural speech is detected, for example, using a microphone positioned with respect to the speaker's mouth. The same speech is detected at the same time in block 44b with the microphone 18 of the ear piece. For purposes of transfer function generation, the output of the microphone 18 is considered a second signal and is representative of the speech as detected from the ear canal.

Next, in blocks 46a and 46b, the first signal and the second signal are respectively converted from the time domain to the frequency domain. For example, the Fourier transform of the first and second signals may be taken.

Figure 9:
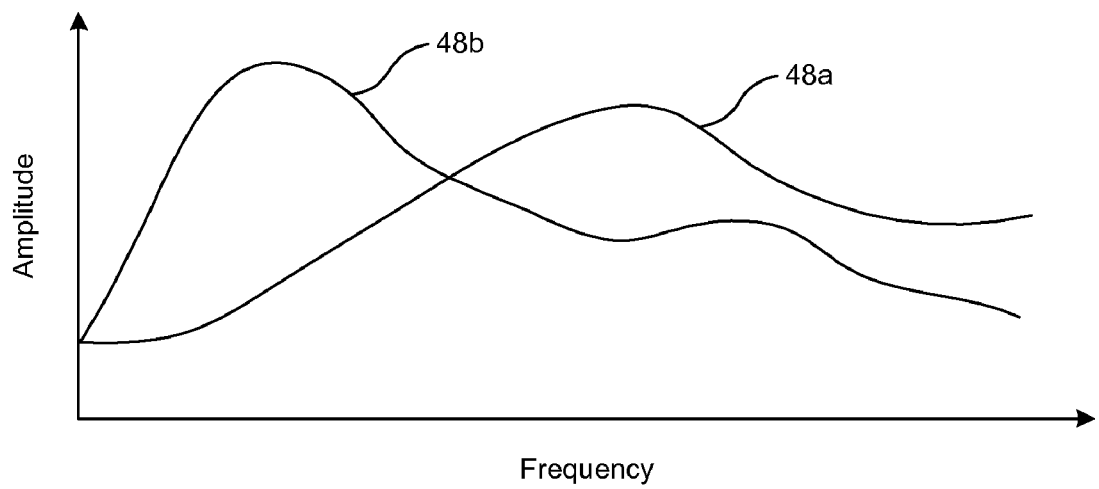
FIG. 9 is a graph having plots of the user's "natural" speech and the speech as detected by the ear piece.

With additional reference to FIG. 9, the spectral response of the first signal (the spectral response for the output from the microphone used to detect the "natural" speech) is shown as plot 48a and the spectral response of the second signal (the spectral response for the output from the microphone 18) is shown as plot 48b. The plots 48a and 48b are exemplary plots to illustrate the steps of the method and may not be accurate representations of actual spectral responses of the signals obtained in blocks 44a and 44b.

In block 50, a ratio between the amplitude of the spectral response for the voice detected from the ear canal 110 in block 44b ($A_{ear}$) to the spectral response for the "natural" voice detected from the mouth in block 44a ($A_{nat}$) may be obtained. A time frame approach to determine the ratio may be used to incrementally compare the spectral responses over a desired frequency range. For instance, the first and second signals may be broken into time frames, where each time frame is about 20 milliseconds long to about 30 milliseconds long. In another embodiment, each time frame may be about 10 milliseconds long to about 30 milliseconds long. In this duration of time, it is rare for the frequency of the detected speech to change by a large amount. By operation of block 50, the amplitude of the spectral response for the first signal may be compared to the amplitude of the spectral response for the second signal for a particular time frame to obtain a ratio of the two responses for a particular frequency (the frequency of the speech signal during the time frame or, for example, an average of the frequency during the time frame).

Next, in block 52, a determination may be made to determine if the ratio of block 50 has been ascertained for each time frame. If there are more time frames to analyze, a positive determination may be made in block 52 and the logical flow may return to block 50. If all of the time frames have been analyzed, a negative determination may be made in block 52 and the logical flow may proceed to block 54. However, if ratios for all frequencies of interest over a frequency range of interest have not been ascertained, the process through block 52 may be repeated with another speech sample to obtain a satisfactory number of ratio values.

Figure 10:
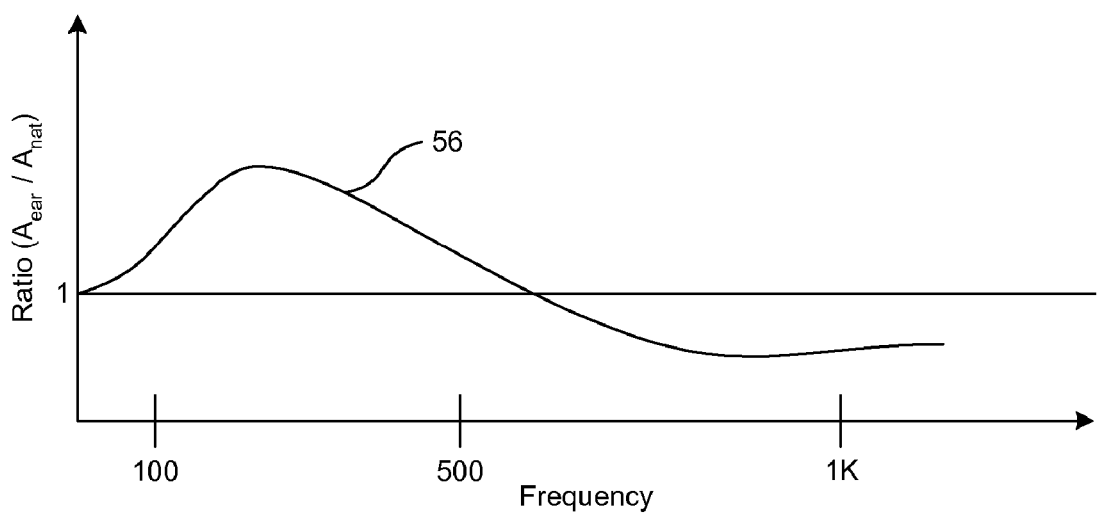
FIG. 10 is a graph having a plot of the transfer function.

In block 54, the ratios for all of the time frames may be combined to generate the transfer function. With additional reference to FIG. 10, illustrated is a plot 56 of the transfer function. The plot 56 is exemplary to illustrate the steps of the method and may not be an accurate representation of an actual transfer function. If multiple time frames generated a ratio for the same frequency, the corresponding ratios may be averaged or addressed in another mathematically relevant manner. In one embodiment, the transfer function may be the result of combining the results from multiple speech samples from a single person and/or combining results from multiple persons. It may be observed that the transfer function is a generally smooth curve that does not include spikes of steep slopes. As a result, the transfer function may be expressed as a relatively simple polynomial and the circuit 42 that uses the transfer function to normalize the output signal of the microphone 18 need not be overly complex.

With reference now to FIG. 11, the signal output by the microphone 18 may be normalized. In block 58, the microphone 18 may detect the user's voice from the user's ear and output a corresponding electrical signal. The electrical signal is input to the circuit 42. In block 60, the circuit 42 processes the circuit by applying the inverse of the transfer function to the signal to change the content of the signal to more accurately represent the user's "natural" form of the same speech. By applying the inverse of the transfer function, high frequency components may be boosted and low frequency components may be attenuated. Thereafter, the circuit 42 may output a normalized signal representative of the user's speech in block 62.

In the exemplary approach of normalizing the detected speech, an inverse of the transfer function is applied to the output signal of the microphone 18. In this case, the inverse of the transfer function may be considered a normalization function. It will be appreciated that other transfer functions may be established and that, in some embodiments, the normalization function may be the same as the transfer function or may be some other function of the transfer function. Additional exemplary techniques for deriving the transfer function and the normalization function will be described in greater detail below.

The circuit 42 also may be used to decrease sensitivity to ambient sounds. For example, the circuit 42 may include filters to remove wind noise, office equipment noise (e.g., as generated by computer fans and air conditions), road noise, background conversations (e.g., the "din" experienced at restaurants and crowded places), music, and so forth. The circuit 42 also may compensate for known anomalies of the microphone 18.

Referring now to FIG. 7, the ear piece 16 may be used in conjunction with the communications device 30 to support fully duplexed conversations with a remotely located person. For this application, or other applications involving the host 12, the ear piece 16 may include the speaker 32. The speaker 32 may be connected to the interface (e.g., wireless adapter 26 or the conductors 24) to receive a signal that the speaker 32 converts into an audible output. Similarly, the microphone 18 may be connected to the interface via the circuit 42 (if present) to deliver a signal corresponding to detected speech to the communication device 30 or the host 12.

In the illustrated embodiment, both the speaker 32 and the microphone 18 are fluidly coupled to the ear canal 110 via the channel 40. In one embodiment, the channel 40 branches to each of the microphone 18 and the speaker 32 using, for example, a "T" or "Y" connector. In other embodiments, the microphone 18 and the speaker 32 may be coupled to the ear canal 110 with separate channels or via separate ports (e.g., the microphone 18 via port 38 and the speaker 32 via a supplemental port).

As will be appreciated, the ear piece 16 may have other configurations. For instance, the ear piece 16 may include the feedback suppression features of the ear pieces disclosed in co-owned U.S. Provisional Patent Application No. 60/734,598 and U.S. patent application Ser. No. 11/557,775 that claims the benefit of this provisional patent application, the disclosures of which are herein incorporated by reference in their entireties. In some embodiments, the fluid coupling of the microphone 18 and/or speaker 32 may be achieved using an acoustically transmissive material instead of or in addition to an air medium. In yet other embodiments, the ear piece 16 may include another microphone for detecting sounds generated from sources external to the ear canal 110. Externally detected sounds may be processed in the manner described in the above-identified patents and applications, or in any other suitable manner.

In one arrangement, the host 12 may manage a speech recognition system for a facility at which the user may be present. For instance, the host 12 may serve as a user interactive terminal for a gas station, a store, a sporting venue, an airport and so forth. The user may ask questions of the host (e.g., in a supermarket, "where is the milk located" or in an airport, "which direction to my gate") and the host may respond in a suitable manner for the recognized speech. The host 12 may seek information from the user, responses to which may be received orally from the user via the ear piece 16 and interpreted by the host 12 using speech recognition. In one embodiment, the ear piece 16 may communicate with the host 12 through the communication device 30 (e.g., by establishment of a wireless interface between the host 12 and the communication device 30).

III. Microphone Signal Normalization

A. Overview

As previously described, the voice signal that is detected by the microphone 18 may be changed from a natural form of the same speech that is detectable with a microphone positioned with respect to the speaker's mouth. To make the speech detected with the microphone 18 sound more like the natural speech, speech equalization may be used to model the differences between the detected speech and a natural version of the speech. As will be described in greater detail, the model may be structured as an inverse filter or a deconvolution filter. For consistency with modeling terminology and for purposes of this description, the speaker may be referred to as a "system" that is "modeled". Following this terminology, speech that is detected from the speaker's mouth may be considered as the input signal x(t) to the system and the speech that is detected from the speaker's ear may be considered as the output signal y(t) to the system. Similarly, the model may use the voice from the ear as the input signal x(t) to estimate the future output $\hat{y}(t,\theta)$, the future output being a synthesized version of the speech from the speaker's mouth, and which may be as close as possible to the natural speech. But modeling system behavior to generate an accurate mathematical expression that represents the system is a challenging task. The following sections describe various embodiments of modeling the system that address these challenges.

The prior section describes an exemplary technique for normalizing the signal that is output by the microphone 18. This section will describe additional techniques for normalizing the signal that is output by the microphone 18 to equalize the speech represented by that signal, thereby synthesizing a natural voice output. In particular, this section describes techniques for mathematically modeling the differences between natural speech of a user and speech detected at an ear of the user.

Figure 12:
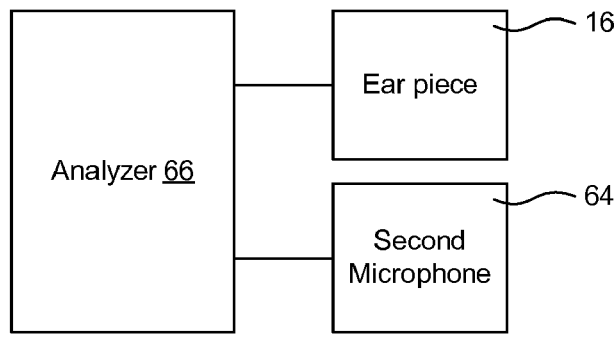
FIG. 12 a schematic block diagram of an exemplary assembly for generating a transfer function and a normalization function.

With additional reference to FIG. 12, an exemplary assembly for generating a transfer function and/or a normalization function is illustrated. The assembly may include the ear piece 16 that is positioned with respect to the ear of a speaker (e.g., a person who speaks) as described above to detect speech that is spoken by the speaker. A second microphone 64 is positioned with respect to the speaker's mouth to simultaneously detect speech from the speaker's mouth. The ear piece 16 may retain the second microphone 64, or the second microphone 64 may be retained separately from the ear piece 16. The microphone 18 of the ear piece 16 and the second microphone 64 may be coupled to an analyzer 66 that analyzes the respective output signals from the microphones 18, 64 to establish the transfer function and/or the normalization function. The analyzer 66 may be embodied as hardware and/or software. For instance, the analyzer 66 may be present as part of the host 12 (FIG. 1).

Once the transfer function and/or the normalization function are determined, the transfer function and/or the normalization function may be embodied into the circuit 42 for normalization of the signal from the microphone 18. For instance, the transfer function and/or the normalization may be made part of firmware present as part of the circuit 42 that resides in the earpiece 16. In another implementation where the circuit 42 includes a processing device and a memory of the host 12 or of the communications device 30, the transfer function and/or the normalization function may be stored so as to be available to an executable normalization function that is embodied as software and executed by the processing device.

In many system modeling approaches, a dynamic system having an input x(t) and an output y(t) is estimated in discrete time with observation data represented by equations 1 and 2.

$$x^t = (x(1), x(2), \ldots, x(t)) \qquad \text{Eq. 1}$$

$$y^t = (y(1), y(2), \ldots, y(t)) \qquad \text{Eq. 2}$$

An analysis may then be made for a connection between past observations $(x^{t-1}, y^{t-1})$ and a future output y(t) as represented by equation 3, where $G(x^{t-1}, y^{t-1})$ is a general (linear and/or nonlinear) function of past observances, and v(t) is a disturbance that is uncorrelated with the input signal.

$$y(t) = G(x^{t-1}, y^{t-1}) + v(t) \qquad \text{Eq. 3}$$

It follows that a mathematical model for $G(x^{t-1}, y^{t-1})$ may be used to predict future output y(t) of the system, which may be expressed using equation 4, where $\hat{y}(t,\theta)$ is a model estimate of the future output y(t), and $\theta$ is a common parameter vector that includes some, if not all, parameters (linear and/or nonlinear) of the model.

$$\hat{y}(t,\theta) = G(x^{t-1}, y^{t-1}, \theta) \qquad \text{Eq. 4}$$

To make the speech detected by the microphone 18 sound as close as possible to the natural version of the same speech, it may be desirable to make the model be an inverse of the system. Therefore, in one embodiment, the system may be denoted by $G(q,\theta)$, which may be considered a simplified version of the notation for $G(x^{t-1}, y^{t-1}, \theta)$. Also, the model may be denoted by $H(q,\theta)$, where $H(q,\theta)$ is the inverse of $G(q,\theta)$ and q is a forward time shift operator.

If the system given by $G(x^{t-1}, y^{t-1}, \theta)$ is substantially time-invariant for a certain time frame, such as about ten milliseconds to about thirty milliseconds, then vector $\theta$ and future output $\hat{y}(t,\theta)$ may be estimated by analyzing one or more sets of speech samples. The analysis of collected speech data to establish a fixed transfer function and/or a fixed normalization function will be referred to as batch estimation. The fixed transfer function and/or the fixed normalization function may be used as a predetermined function for application to future output signals from the microphone 18 (e.g., when the second microphone 64 is not present). Under batch estimation, a single historical data set that is collected within a window of time is used in each iteration of the estimation.

For time-invariant systems and for time-varying systems, the vector $\theta$ and future output $\hat{y}(t,\theta)$ may be estimated by analyzing speech data as the speech data is received. The analysis of speech data in this manner will be referred to as adaptive analysis, which is used to establish and revise an adaptive filter that applies a dynamic normalization function to generate a normalized output signal based on input from the microphone 18. Under adaptive analysis, a new data sample may be available for each iteration time of the estimation. The continual revision of the adaptive filter may be implemented in the presence of the second microphone 64 so that the dynamic normalization function is applied to ongoing output signals from the microphone 18. In one embodiment, the adaptive analysis may be used for a relatively short period of time (e.g., about thirty seconds to about five minutes) to establish a predetermined normalization function. Then, the second microphone 64 may be removed, the adaptive component of the filter may be turned off and the predetermined normalization function may be applied to future output signals from the microphone 18.

B. Batch Estimation

For batch estimation, a set of discrete input data values for the system may be given by equation 5 and a set of discrete output data values for the system may be given by equation 6, in which N is the number of data points.

$$x^N = (x(1), x(2), \ldots, x(N)) \qquad \text{Eq. 5}$$

$$y^N = (y(1), y(2), \ldots, y(N)) \qquad \text{Eq. 6}$$

A transfer function of the system may be given by $G(q,\theta)$. For a speech system, the transfer function $G(q,\theta)$ is substantially time-invariant for a relatively short period time (e.g., about ten milliseconds to about thirty milliseconds). In this case, the data set $(x^N, y^N)$ may be divided into plural data sets that each have $N_1$ data points when $N_1$ is less than N. In one example, if the input and the output are sampled at about eight kilohertz (kHz) and $G(q,\theta)$ is time-invariant for a period of about ten milliseconds, then each data set may have eighty data points (or $N_1$ equals eighty).

Figure 13:
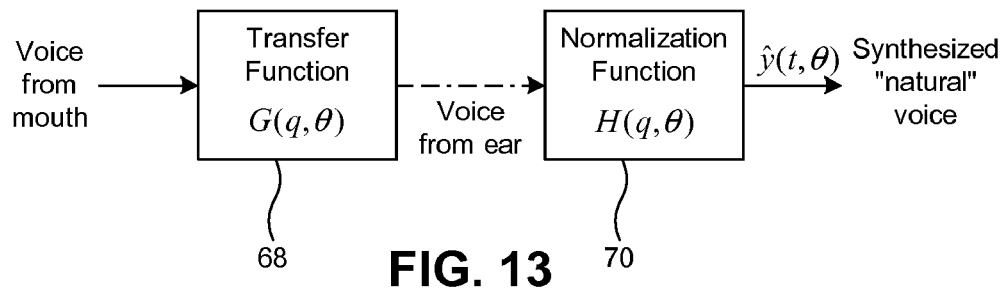
FIG. 13 is a diagram that depicts a batch estimation method for generating a transfer function and applying a normalization function that is based on the transfer function to a microphone output signal.

With additional reference to FIG. 13, an exemplary batch estimation method for generating a transfer function and applying a normalization function that is based on the transfer function to the microphone 18 output signal is shown. Process block 68 uses the natural voice signal as detected with respect to the mouth of the speaker as the input signal x(t) and the voice signal as detected from the ear canal as the output signal y(t) to estimate the transfer function $G(q,\theta)$. Therefore, process block 68 may be considered a logical operation to analyze the signals to generate a transfer function for the speech system.

Using the voice detected from the ear canal as an input signal, process block 70 represents using the inverse of the transfer function $G(q,\theta)$ to synthesize the output signal $\hat{y}(t,\theta)$. The inverse of the transfer function $G(q,\theta)$ is the model $H(q,\theta)$, which as also referred to as the normalization function. In this regard, process block 70 applies the normalization function $H(q,\theta)$ to the voice signal that is detected from the ear canal. Therefore, process block 70 may be considered a logical operation to apply the model of the speech system to the signal that is output by the microphone 18.

Establishment of the transfer function and/or the normalization function under batch estimation may be carried out in a user-independent manner or a user-specific manner. As indicated, the transfer functions of multiple people may resemble one another. Under this observation, a composite transfer function may be established by averaging or otherwise combining the respective transfer functions from multiple persons. Each person's transfer function may be established by having the individual speak while the microphone 18 detects sound from the ear and the second microphone 64 detects sound from the speaker's mouth. The signals from the respective microphones may be compared to generate the transfer function for the speaker, which are then combined to generate the composite transfer function. In one embodiment, this composite transfer function may be used to normalize the speech signal detected from the ear of any individual user of the microphone 18 so that the normalized signal closely resembles the "natural" speech of the individual user.

In another embodiment, the step of estimating the transfer function may be made for the specific user as part of a user-specific training process for the ear piece 16. For example, the user may speak while the microphone 18 detects sound from the ear and the second microphone 64 detects sound from the user's mouth. The signals from the respective microphones may be compared to generate the transfer function for the user. Thereafter, the user may speak so that the speech is detected only by the microphone 18 and the inverse of the transfer function that was established for the user may be applied to the detected signal to normalize the detected signal.

1. Batch Estimation Using Frequency Response

An exemplary technique of determining the transfer function using the frequency responses of the signal output by the microphone 18 and the signal output by the second microphone 64 that is arranged with respect to the speakers' mouth is described above in connection with FIG. 8. In this technique, a ratio of the frequency response of the signal from microphone 18 to the frequency response of the signal from the microphone 64 is established. In one approach, the ratio is established by using data sets that each have $N_1$ data points and that each have a time frame over which the transfer function of the system is assumed to be substantially time-invariant. Then, the estimated ratio for each time frame is combined for the available time frames until N data points are addressed, where $N_1$ is less than N. The ratio may be computed in accordance with equation 7, where j is the square root of negative one $(j=\sqrt{-1})$.

$$\text{Ratio } (jw) = \frac{A_{ear}(jw)}{A_{nat}(jw)} \quad \text{Eq. 7}$$

2. Batch Estimation Using Time Domain Response

The transfer function may be established using time domain signals rather than the frequency domain signals described in the preceding section. The time domain signal may be the value (e.g., amplitude) of the output signals from the respective microphones 18, 64. When time domain response is used, a ratio may be calculated to serve as the transfer function $G(q,\theta)$. Any suitable filter structure may be used, an example of which is a linear regression model. Under a linear regression model, equations 8 through 10 may be established, where M is a dimension of the parameter vector $\theta$, $N_1$ is less than N, the superscript $-1$ denotes an inverse, and the superscript T denotes a transpose.

$$X(t)=[x(t), \ldots, x(t-M+1)]^T \quad \text{Eq. 8}$$

$$\tilde{X}=[X(1), X(2), \ldots, X(N_1)]^T \quad \text{Eq. 9}$$

$$Y=[y(1), y(2), \ldots, y(N_1)]^T \quad \text{Eq. 10}$$

The ratio used as the transfer function may be expressed using equation 11. One exemplary technique for computing $\tilde{X}^{-1}$ for equation 11 is to use a pseudo-inverse algorithm, such as the Moore-Penrose algorithm.

$$\text{Ratio}(\theta)=\tilde{X}^{-1}Y \quad \text{Eq. 11}$$

C. Adaptive Estimation

Figure 14:
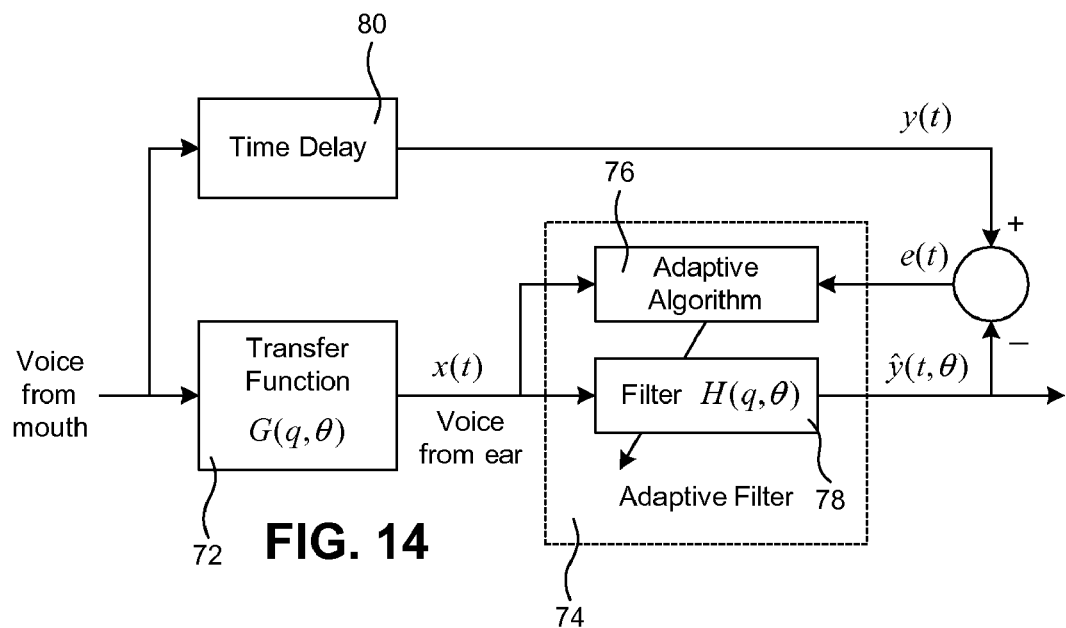
FIG. 14 is a diagram that depicts an adaptive estimation method for generating a transfer function and applying a normalization function that is based on the transfer function to a microphone output signal.

With additional reference to FIG. 14, an adaptive estimation method for generating a transfer function and applying a normalization function that is based on the transfer function to the microphone 18 output signal is illustrated. For adaptive estimation, a new data sample established from the input signal and the output signal may be available for each estimation time. Also, the speech system may be time varying such that recent data at time t is more representative of the speech system than old data. The input signal may be expressed by equation 12 and the output signal may be expressed by equation 13.

$$x^t=(x(1), x(2), \ldots, x(t)) \quad \text{Eq. 12}$$

$$y^t=(y(1), y(2), \ldots, y(t)) \quad \text{Eq. 13}$$

Under at least these circumstances, an adaptive estimation technique may be used to produce a synthesized "natural" voice output, also referred to as the future output $\hat{y}(t,\theta)$. The technique, as illustrated by FIG. 14, includes a process block 72 for generating the transfer function $G(q,\theta)$. The technique also includes a process block 74 to apply an adaptive filter to the signal output by the microphone 18. The adaptive filter process block 74 may include an adaptive algorithm process block 76 and a model or filter process block 78 that applies the normalization function H(q,θ).

The adaptive algorithm may be used to track time varying statistics of the voice from the ear (e.g., as represented by input signal x(t) to the model). A delayed version of the voice from the mouth (e.g., as represented by y(t)) may be combined with the synthesized output ŷ(t,θ) to generate an estimated error e(t) that is input to the adaptive algorithm of process block 76. A time delay process block 80 may be used to delay the voice from the mouth. In response to these inputs (the voice from the ear and the estimated error), the adaptive algorithm may adjust the vector θ from the normalization function H(q,θ) to adjust the estimation of the synthesized output ŷ(t,θ). The model used to represent the speech system may be a linear regression model, or any suitable filter structure. The linear regression model may include, for example, a finite impulse response (FIR) filter. In the exemplary techniques described below, a linear regression model will be used.

The adaptive filter may recursively adjust the vector θ of the model so that the normalization function H(q,θ) functions as an inverse of the transfer function G(q,θ) even as the transfer function G(q,θ) changes over time. Since the model parameters of the adaptive filter may be automatically adjusted for each new data sample at time t, the adaptive filter may automatically adjust its normalization function based on data samples attained from any individual speaker. Therefore, an individual's use of the adaptive estimation method may result in automatic training of the speech system to establish a transfer function and a normalization function that are appropriate for the individual at a time instance t.

1. Adaptive Estimation

Example 1

A first example of adaptive estimation is described in this section. Equations 14a and 14b express a general adaptive algorithm, where $\hat{\theta}(t)$ is an estimate of θ at time t, M is the dimension of the parameter vector θ, μ(t) is an adaptive gain, V(t,θ) is a first order differential of a criterion that minimizes the error e(t), and R(t,θ) is a second order differential of a criterion that minimizes the error e(t). The superscript −1 denotes an inverse and the superscript T denotes a transpose.

$$\hat{\theta}(t) = [\hat{\theta}_1(t), \ldots, \hat{\theta}_M(t)]^T \quad \text{Eq. 14a}$$

$$\hat{\theta}(t) = \hat{\theta}(t-1) + \mu(t) R^{-1}(t,\theta) V(t,\theta) \quad \text{Eq. 14b}$$

If H(q,θ) is a linear regression model, then a transformed version of the input vector X(t) at time t may be Z(t) as expressed in equation 15, where T(q,η) is a square transformation matrix (e.g., an M-by-M matrix) that is parameterized by a vector η.

$$Z(t) = [z_1(t), \ldots, z_M(t)]^T = T(q,\eta)[x(t), \ldots, x(t-M+1)]^T \quad \text{Eq. 15}$$

Also, the synthesized output ŷ(t,θ) may be represented by equation 16 and the estimation error may be represented in equation 17.

$$\hat{y}(t,\theta) = \hat{\theta}^T(t-1) Z(t) \quad \text{Eq. 16}$$

$$e(t,\theta) = y(t) - \hat{\theta}^T(t-1) Z(t) \quad \text{Eq. 17}$$

Various criteria may be used to establish a basis by which the algorithm estimates the parameters for the vector θ. In one embodiment a least-squares error criterion is used such that equation 18 results.

$$V(t,\theta) = Z(t) e(t,\theta) \quad \text{Eq. 18}$$

In one embodiment to reduce mathematical complexity, R(t,θ) may be made to equal a square identity matrix I by ignoring the second order differential of the criterion. In this embodiment, equation 19 results, where I is an M-by-M identity matrix. Also, a gain μ(t) may be selected in accordance with equation 20, where μ is greater than zero and less than two (e.g., 0<μ<2).

$$\hat{\theta}(t) = \hat{\theta}(t-1) + \mu(t) Z(t) e(t,\theta) \quad \text{Eq. 19}$$

$$\mu(t) = \frac{\mu}{Z^T(t) Z(t)} \quad \text{Eq. 20}$$

From the foregoing, the adaptive filter may be implemented in accordance with equations 21 through 25 where the estimated output ŷ(t,θ) is a function of a transformed version of the input vector X(t). Driving the adaptive filter will be the transformation matrix T(q,η). Selection of the transformation matrix T(q,η) will be described in greater detail below.

$$X(t) = [x(t), \ldots, x(t-M+1)]^T \quad \text{Eq. 21}$$

$$Z(t) = T(q,\eta) X(t) \quad \text{Eq. 22}$$

$$\hat{y}(t,\theta) = \hat{\theta}^T(t-1) Z(t) \quad \text{Eq. 23}$$

$$e(t,\theta) = y(t) - \hat{\theta}^T(t-1) Z(t) \quad \text{Eq. 24}$$

$$\hat{\theta}(t) = \hat{\theta}(t-1) + \frac{\mu}{Z^T(t) Z(t)} Z(t) e(t,\theta), \quad \text{Eq. 25}$$

where $0 < \mu < 2$

It may be shown that the adaptive filter implemented in accordance with equations 21 through 25 is stable. For instance, if it is assumed that $\epsilon(t) = \hat{\theta}(t) - \theta_0$, where $\theta_0$ is the true parameter vector of an inverse of the system's transfer function G(q,θ), then i) $y(t) = \theta_0^T Z(t)$ if the disturbance v(t) is assumed to be negligible, and ii) a difference equation given by equation 26 results, where Γ is a matrix.

$$\varepsilon(t) = \left[I - \frac{\mu Z(t) Z^T(t)}{Z^T(t) Z(t)}\right] \varepsilon(t-1) = \Gamma \varepsilon(t-1) \quad \text{Eq. 26}$$

The matrix Γ may have Eigen values of [1−μ, 1, ... 1]. Also, since 0<μ<2, then |1−μ|<1 and a conclusion that the implementation of the adaptive filter is stable may be reached.

2. Adaptive Estimation

Example 2

A second example of adaptive estimation is described in this section. The second example is similar to the first example, but where the estimated output ŷ(t,θ) may be a function of a non-transformed version of the input vector X(t). If the same general adaptive estimation technique set forth in the first example is used, but it assumed that the normalization function H(q,θ) is a linear regression model and that R(t,θ)=I, then another set of equations to implement the adaptive filter may be established. The equations are set forth in equations 27 through 31. Driving the adaptive filter will be the transformation matrix T(q,η). Selection of the transformation matrix T(q,η) will be described in greater detail below.

$$X(t) = [x(t), \ldots, x(t - M + 1)]^T \quad \text{Eq. 27}$$

$$Z(t) = T(q, \eta)X(t) \quad \text{Eq. 28}$$

$$\hat{y}(t, \theta) = \hat{\theta}^T(t-1)X(t) \quad \text{Eq. 29}$$

$$e(t, \theta) = y(t) - \hat{\theta}^T(t-1)X(t) \quad \text{Eq. 30}$$

$$\hat{\theta}(t) = \hat{\theta}(t-1) + \frac{\mu}{Z^T(t)X(t)} Z(t) e(t, \theta) \quad \text{Eq. 31}$$

It may be shown that the adaptive filter implemented in accordance with equations 27 through 31 is stable. For instance, using the same technique for analyzing stability as was used for the first example, the difference equation of equation 32 may be derived.

$$\varepsilon(t) = \left[I - \frac{\mu Z(t)X^T(t)}{Z^T(t)X(t)}\right]\varepsilon(t-1) = \Pi\varepsilon(t-1) \quad \text{Eq. 32}$$

The matrix $\Pi$ may have Eigen values of $[1-\mu, 1, \ldots 1]$. Also, since $0<\mu<2$, then $|1-\mu|<1$ and a conclusion that the implementation of the adaptive filter is stable may be reached.

3. Selection of Transformation Matrix for Adaptive Estimation

As indicated, the adaptive estimation techniques described herein may be driven by the transformation matrix $T(q,\eta)$. With appropriate selection of the transformation matrix $T(q,\eta)$, the adaptive filter may achieve relatively fast convergence with relatively low mathematical complexity. One possible transformation matrix is an identity matrix. While an identity matrix may have relatively low mathematical complexity, the first and second example implementations become normalized least means square (LMS) algorithms when an identity matrix is selected as the transformation matrix. But normalized LMS algorithms are known to converge slowly when the input signal is highly correlated, as is the case with a signal representing speech. Therefore, a faster converging transformation matrix may be desirable.

In one embodiment, the transformation matrix $T(q,\eta)$ is selected to decorrelate in the input signal so that the transformation matrix $T(q,\eta)$ will "whiten" the input signal before being used by the adaptive algorithm to update the parameter vector $\hat{\theta}(t)$. Decorrelating the input may serve to reduce the correlation (e.g., relationship) between the current input value (e.g., $x(t)$) from the past history of input values.

In one embodiment, the transformation matrix $T(q,\eta)$ may be represented as set forth in equation 33, where $\eta(t)=[\eta_1(t), \ldots \eta_P(t)]$ is the parameter vector $\eta$ at time $t$ and represents the coefficients of a decorrelating filter, and $q$ is a backward time shift operator (also referred to as a time delay).

$$T(q, \eta) = \begin{bmatrix} 1 & \eta_1(t) & \cdots & \eta_P(t) & 0 & 0 & \cdots & 0 \\ q^{-1} & q^{-2}\eta_1(t) & \cdots & q^{-P-1}\eta_P(t) & 0 & 0 & \cdots & 0 \\ \vdots & \vdots & \ddots & & \vdots & \vdots & \ddots & \vdots \\ q^{-M+1} & q^{-M}\eta_1(t) & \cdots & q^{-M-P+1}\eta_P(t) & 0 & 0 & \cdots & 0 \end{bmatrix} \quad \text{Eq. 33}$$

In one embodiment, the coefficients of the decorrelating filter may be computed by a Levinson-Durbin algorithm. The selection of the transformation matrix $T(q,\eta)$ in the foregoing manner may result in an implementation of the first example or the second example that has faster convergence than if a normalized LMS algorithm is selected.

IV. Conclusion

Although particular embodiments have been described in detail, it is understood that the invention as defined by the appended claims is not limited correspondingly in scope, but includes all changes, modifications and equivalents.

What is claimed is:

1. A sound processing apparatus, comprising:
a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and
a circuit that normalizes the output signal from the microphone by applying a normalization function to the output signal from the microphone, the normalized signal having a spectral response that is closer to the spectral response of the speech from the mouth of the user than the spectral response of the output signal from the microphone;
wherein the normalization function is an inverse of a transfer function that is based on a ratio of a spectral response of a speech sample detected from the mouth of a sampled individual to a spectral response of the speech sample detected from the ear of the sampled individual.

2. The sound processing apparatus of claim 1, wherein the microphone and the circuit are contained within a housing that is retained by the ear of the user.

3. The sound processing apparatus of claim 1, wherein the microphone is contained within an ear piece that is retained by the ear of the user and the circuit forms part of a separate device that is interfaced with the ear piece.

4. The sound processing apparatus of claim 1, wherein the transfer function is a composite function that is combination of plural spectral response ratios taken from plural individuals.

5. The sound processing apparatus of claim 1, wherein the transfer function is a combination of a series of ratio values of the spectral response of the speech detected from the ear to the spectral response of the speech detected from the mouth for each of plural time frames of the speech sample.

6. The sound processing apparatus of claim 5, wherein the time frames are about 10 milliseconds to about 30 milliseconds long.

7. The sound processing apparatus of claim 1, wherein the transfer function is user dependent and the speech sample is generated by the user of the sound processing apparatus.

8. The sound processing apparatus of claim 1, wherein the transfer function is user independent and the speech sample is generated by at least one speaker different than the user of the sound processing apparatus.

9. A sound processing apparatus, comprising:
a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone;

wherein the normalization function is an inverse of a transfer function that is based on a ratio of a time domain response of a speech sample detected from the mouth of a sampled individual to a time domain response of the speech sample detected from the ear of the sampled individual.

10. A sound processing apparatus, comprising:

a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone;

wherein the normalization function is adaptively established by an adaptive filter that models a difference between a sound signal from the ear and a corresponding sound signal from the mouth;

wherein the normalization function is based on a transformation matrix that is selected to decorrelate a current value of the output signal from the microphone from a past history of output signal values.

11. A sound processing apparatus, comprising:

a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone;

wherein the normalization function is adaptively established by an adaptive filter that models a difference between a sound signal from the ear and a corresponding sound signal from the mouth;

wherein the normalization function is based on a transformed version of an input vector that models the difference between the sound signal from the ear and the corresponding sound signal from the mouth.

12. A sound processing apparatus, comprising:

a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone;

wherein the normalization function is adaptively established by an adaptive filter that models a difference between a sound signal from the ear and a corresponding sound signal from the mouth;

wherein the normalization function is based on a non-transformed version of an input vector that models the difference between the sound signal from the ear and the corresponding sound signal from the mouth.

13. A sound processing apparatus, comprising:

a microphone positionable with respect to an ear canal to detect sound signals from the ear canal and to generate a corresponding output signal, wherein the output signal from the microphone corresponds to a portion of speech and has a different spectral response than a spectral response of the same speech from the mouth of a user; and a circuit that normalizes the output signal from the microphone by applying a normalization function to the output signal from the microphone, the normalized signal having a spectral response that is closer to the spectral response of the speech from the mouth of the user than the spectral response of the output signal from the microphone;

wherein the normalization function is adaptively established by an adaptive filter that models a difference between a sound signal from the ear and a corresponding sound signal from the mouth;

wherein the normalization function is established by sampling speech data from an ear and a mouth of a user for a period of time and adaptively generating the normalization function over the period of time.

14. The sound processing apparatus of claim 13, wherein the adaptive updating of the normalization function is stopped after the period of time.

15. The sound processing apparatus of claim 1, further comprising a host that executes speech recognition software to process the normalized output signal.

16. The sound processing apparatus of claim 1, further comprising a communications device that transmits the normalized output signal to a remote destination.

* * * * *